United States Patent [19]
Hori et al.

[11] Patent Number: 5,819,800
[45] Date of Patent: Oct. 13, 1998

[54] HYDRAULIC PILOT VALVE

[75] Inventors: Shuji Hori; Kei Kawabata; Jun Maruyama, all of Tochigi-ken, Japan

[73] Assignee: Komatsu Ltd., Tokyo, Japan

[21] Appl. No.: 849,366

[22] PCT Filed: Dec. 8, 1995

[86] PCT No.: PCT/JP95/02529

§ 371 Date: Jun. 5, 1997

§ 102(e) Date: Jun. 5, 1997

[87] PCT Pub. No.: WO96/18056

PCT Pub. Date: Jun. 13, 1996

[30] Foreign Application Priority Data

Dec. 8, 1994 [JP] Japan ................................. 6-304930

[51] Int. Cl.$^6$ ..................................................... F15B 13/02
[52] U.S. Cl. ...................... 137/636.1; 91/523; 137/596.1
[58] Field of Search .......................... 91/523; 137/596.1, 137/636.1, 636.2

[56] References Cited

U.S. PATENT DOCUMENTS 5,184,646  2/1993  Hori et al. ............................ 137/636.2
5,558,127  9/1996  Maruyama et al. .................. 137/636.1

FOREIGN PATENT DOCUMENTS

2-143581  12/1990  Japan .
3-17386    2/1991  Japan .
5-81510   11/1993  Japan .

Primary Examiner—Gerald A. Michalsky
Attorney, Agent, or Firm—Wenderoth, Lind & Ponack, L.L.P.

[57] ABSTRACT

A hydraulic pilot valve includes a valve body, first, second, third and fourth pressure reduction valves formed in the valve body and respectively having, outlet ports, inlet ports and spools for establishing and blocking communication between the ports, and an operation lever pivotally mounted on the valve body and being movable between a neutral position, a first position and a second position. When the operation lever is in the neutral position, the respective spools of the second and third pressure reduction valves are placed at positions establishing communication between the respective inlet port and outlet port. When the operation lever is in the first position, the respective spools of the first and third pressure reduction valves are placed at positions establishing communication between the respective inlet port and outlet port, and in conjunction therewith, the respective spools of the second and fourth pressure reduction valves block communication between the respective inlet port and outlet port. When the operation lever is in the second position, the respective spools of the first and third pressure reduction valves are placed at positions blocking communication between the respective inlet port and outlet port, and in conjunction therewith, the respective spools of the second and fourth pressure reduction valves are placed at positions establishing communication between the respective inlet ports and outlet port.

5 Claims, 13 Drawing Sheets

FIG. 10A
FIRST REDUCTION VALVE

FIG. 10B
SECOND REDUCTION VALVE

FIG. 10C
THIRD REDUCTION VALVE

FIG. 10D
FOURTH REDUCTION VALVE

HYDRAULIC PILOT VALVE

TECHNICAL FIELD

The present invention relates to a hydraulic pilot valve employed in an operating device of a crawler type vehicle having a hydraulic steering clutch and a hydraulic steering brake.

BACKGROUND ART

As a hydraulic pilot valve, various valves have been known, for example, as shown in Japanese Unexamined Utility Model Publication (Kokai) No. Heisei 2-143581, a pressure reduction valve, a piston adapted to be returned to a neutral position by means of a spring for actuating the pressure reduction valve, a pushing member for pushing down the piston, and an operation lever rockable between the neutral position and an operating position. When the operation lever is placed at the neutral position, the piston is held in an upper position by the spring to block an inlet port and an outlet port of the pressure reduction valve. By operating the operation lever so that it moves from the neutral position to the operating position, the pushing member is depressed against the spring to push down the piston to situate the pressure reduction valve in a pressurized fluid supply condition, namely the inlet port is communicated with the outlet port of the pressure reduction valve via an opening area proportional to the operation magnitude of the operation lever.

On the other hand, as a driving device for a crawler type vehicle, there has been known an engine output which is transmitted to left and right drive tumblers via a left and right pair of hydraulic steering clutches and a left and right pair of hydraulic steering brakes for driving left and right crawlers by the left and right drive tumblers. Furthermore, there has been known an operation device for performing steering operation by controlling a pair of left and right hydraulic steering clutches and a pair of left and right hydraulic steering brakes.

Figure 1:
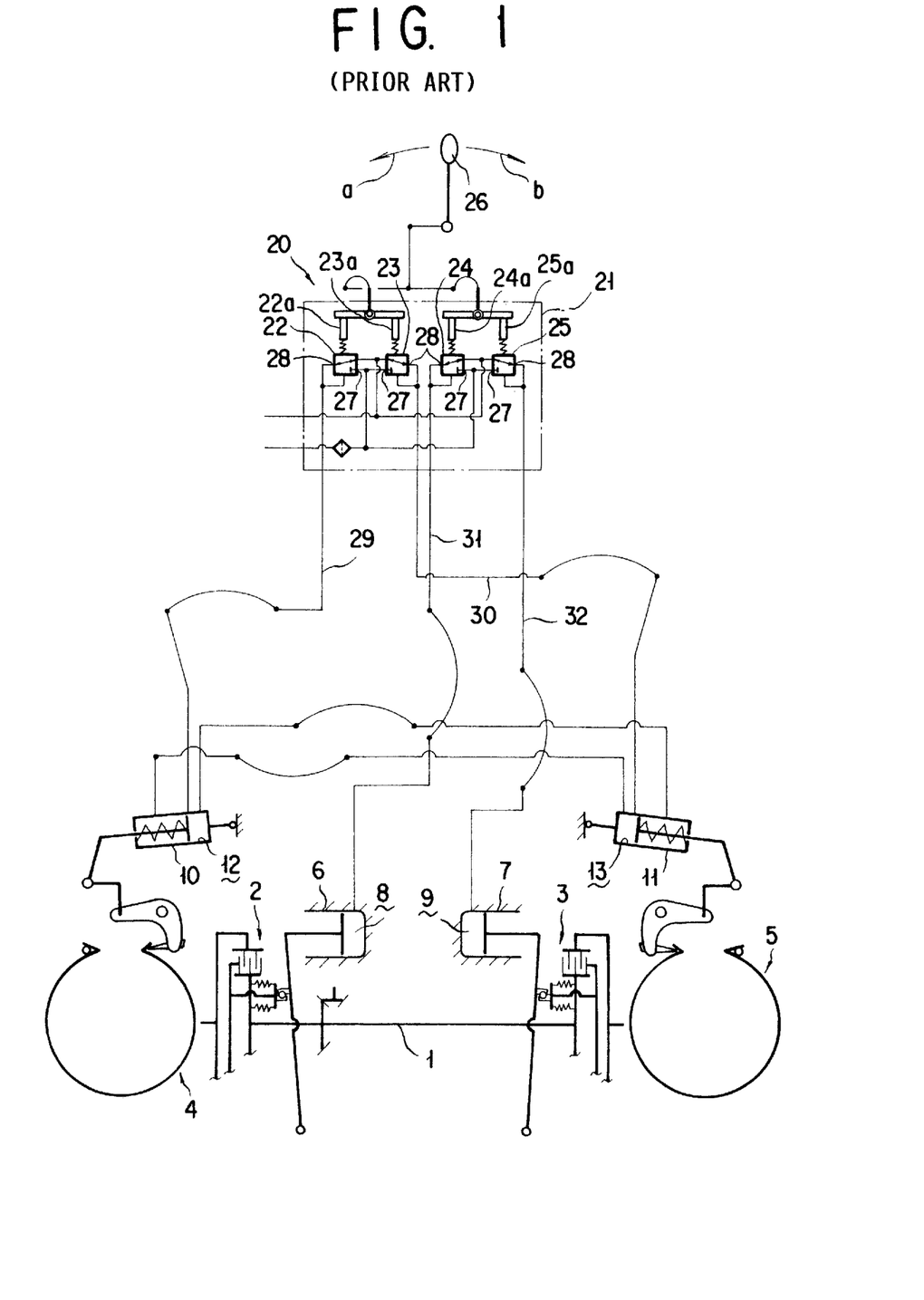
FIG. 1 is a general illustration of a conventional steering device of a conventional crawler type vehicle.

The foregoing conventional steering device is constructed as shown in FIG. 1, for example.

There are provided a left hydraulic steering clutch 2 and a right steering clutch 3 at left and right ends of a transverse axle 1, left and right clutch cylinders 6 and 7 for driving the left and right hydraulic steering clutches 2 and 3, respectively in the vicinity of the latter, a left hydraulic steering brake 4 and a right hydraulic steering brake 5 at output sides of the left and right hydraulic steering clutches 2 and 3, and left and right brake cylinders 10 and 11 respectively driving the left and right hydraulic steering brakes 4 and 5 in the vicinity of the latter. When pressurized fluid is supplied to pressure receiving chambers 8 and 9 of the left and right clutch cylinders 6 and 7, the left and right hydraulic steering clutches 2 and 3 are disconnected, and when the pressurized fluid is not supplied, the clutches are connected. When pressurized fluid is charged into pressure receiving chamber 12 and 13 of the left and right brake cylinders 10 and 11, the left and right hydraulic steering brakes 4 and 5 are in braking conditions, and if the pressurized fluid is not supplied, the brakes are in non-braking condition.

A hydraulic pilot valve 20 includes first, second, third and fourth pressure reduction valves 22, 23, 24 and 25, and an operation lever 26 for respectively operating the first, second, third and fourth pressure reduction valves 22, 23, 24 and 25 via pistons 22a, 23a, 24a and 25a. When the operation lever 26 is moved from the neutral position in one direction (direction of arrow a), the inlet ports 27 and the

2 output ports 28 of the first and third pressure reduction valves 22 and 24 are communicated with each other. When the operation lever 26 is moved from the neutral position in the other direction (direction of arrow b), the inlet ports 27 and the output ports 28 of the second and fourth pressure reduction valves 23 and 25 are communicated with each other.

Then, the outlet port 28 of the first pressure reduction valve 22 is connected to the pressure receiving chamber 12 of the left brake cylinder 10 via a first circuit 29. The outlet port 28 of the second pressure reduction valve 23 is connected to the pressure receiving chamber 13 of the right brake cylinder 11 via a second circuit 30. The outlet port 28 of the third pressure reduction valve 24 is connected to the pressure receiving chamber 8 of the left clutch cylinder 6 via the third circuit 31. The outlet port 28 of the fourth pressure reduction valve 25 is connected to the pressure receiving chamber 9 of the right clutch cylinder 7 via a fourth circuit 32.

Thus, with the conventional steering device set forth above, when the operation lever 26 is moved in one direction (direction of arrow a), the left hydraulic steering clutch 2 is disconnected, the left hydraulic steering brake 4 is in a braking condition, and the vehicle makes a left turn. When the operation lever 26 is moved in the other direction (direction of arrow b), the right hydraulic steering clutch 3 is disconnected, the left hydraulic steering brake 5 is in a braking condition, and the vehicle makes a right turn.

Namely, in the conventional hydraulic pilot valve 20, when the operation lever 26 is in the neutral position, the inlet ports 27 and the outlet ports 28 of the first, second, third and fourth pressure reduction valves 22, 23, 24 and 25 are blocked, and thus the output pressure becomes zero. When the operation lever 26 is moved from the neutral position in one or the other direction, the inlet port 27 and the outlet port 28 are communicated, and then the output pressure becomes proportional to the operation magnitude (i.e. amount of movement) of the operation lever 26.

On the other hand, when the crawler type vehicle is driven straight, the left and right hydraulic steering clutches 2 and 3 are connected, and the left and right hydraulic steering brakes 4 and 5 are in non-braking conditions. Namely, by the hydraulic pilot valve 20 shown in FIG. 1, the left and right steering clutches 2 and 3 are held in connected (i.e. engaged) conditions by the spring force since pressurized fluid is not supplied to the pressure receiving chambers 8 and 9 of the left and right clutch cylinders 6 and 7, and the left and right hydraulic steering brakes 4 and 5 are held in non-braking conditions by the spring force since no pressurized fluid is supplied to the pressure receiving chambers 12 and 13 of the left and right brake cylinders 10 and 11.

Therefore, when a failure or the like occurs in the engine of the crawler type vehicle, the output pressure of the hydraulic pilot valve 20 is held at zero even when the operation lever 26 is operated. Therefore, the left and right hydraulic steering clutches 2 and 3 are in connected conditions to maintain the transverse axle 1 connected with the drive tumblers. Thus, upon traction travel of the crawler type traveling vehicle, rotation resistance of the crawler becomes large.

This problem could be solved by arranging the left and right hydraulic steering clutches 2 and 3 to be normally disconnected and to become connected when the pressurized fluid is supplied to the left and right clutch cylinders 6 and 7. However, when such conventional hydraulic pilot valve 20 is employed, the output pressure becomes zero when the operation lever 26 is in the neutral position to maintain the left and right hydraulic steering clutches 2 and 3 in disconnected conditions. Thus, it becomes impossible to drive the crawler type vehicle straight.

Therefore, in view of the problems set forth above, an object of the present invention is to provide a hydraulic pilot valve which can permit the crawler type vehicle to travel straight when the operation lever is in the neutral position even if the left and right hydraulic steering clutches are held normally disconnected and are connected when the pressurized fluid is supplied to the left and right clutch cylinders.

SUMMARY OF THE INVENTION

In order to accomplish the foregoing objects, there is provided, in accordance with one aspect of the invention, a hydraulic pilot valve comprising:

a valve body;

first, second, third and fourth pressure reduction valves formed in the valve body and respectively having, outlet ports, inlet ports and spools for establishing and blocking communication between the both outlet ports and inlet ports; and an operation lever pivotally mounted on the valve body and that the operation lever can move between a neutral position, a first position and a second position.

When the operation lever is in the neutral position, the respective spools of the second and third pressure reduction valves are placed at positions establishing communication between the respective inlet port and outlet port.

When the operation lever is in the first position, the respective spools of the first and third pressure reduction valves are placed at positions establishing communication between the respective inlet port and outlet port, and in conjunction therewith, the respective spools of the second and fourth pressure reduction valves are placed at positions blocking communication between the respective inlet port and outlet port.

And when the operation lever is in the second position, the respective spools of the first and third pressure reduction valves are placed at positions blocking communication between the respective inlet port and outlet port, and in conjunction therewith, the respective spools of the second and fourth pressure reduction valves are placed at positions established communication between the respective inlet ports and outlet ports.

With the construction set forth above, when the operation lever is in the neutral position, output pressure is output from the second and third pressure reduction valves, in the first position, output pressure is output from the first and second pressure reduction valves, and in the second position, output pressure is output from the second and fourth pressure reduction valves.

Accordingly, by connecting the outlet ports of the first, second, third and fourth pressure reduction valves to the pressure receiving chamber of the left brake cylinder of the left hydraulic steering brake, the pressure receiving chamber of the left clutch cylinder of the left hydraulic steering clutch, the pressure receiving chamber of the right clutch cylinder of the right hydraulic steering clutch and the pressure receiving chamber of the right brake cylinder of the right hydraulic steering brake, the crawler type vehicle can travel straight when the operation lever is in the neutral position even in an arrangement where the left and right hydraulic steering clutches are normally disconnected and are connected when the pressurized fluid is supplied to the left and right clutch cylinders.

In the construction set forth above, it is preferred that each of the first, second third and fourth pressure reduction valves includes a piston for pushing the spool in a direction for establishing communication, a primary spring biasing the piston upwardly, a pressure reduction valve spring disposed between the spool and the piston, and a pressure receiving chamber communicated with the outlet port for pushing the spool in a direction for blocking communication by the output pressure. When the piston is in an upper stroke end position, the spool is in a blocking position, and when the piston is located at a position lower than the upper stroke end position, the spool is in a communicating position.

First and second arms are mounted on a support shaft, to which the operation lever is fixed. First and second rollers contacting with the head portions of the pistons of the first and second pressure reduction valves, are mounted on the first arm, and third and fourth rollers contacting with the head portions of the pistons of the third and fourth pressure reduction valves are mounted on the second arm.

When the operation lever is in the neutral position, the first and fourth rollers are placed above the second and third rollers, and at this time, the pistons of the first and fourth pressure reduction valves are placed at the upper stroke end positions, and the pistons of the second and third pressure reduction valves are located at positions lower than the upper stroke end positions.

In an alternative, of the foregoing construction, each of the first, second third and fourth pressure reduction valves includes a piston for pushing the spool in a direction for establishing communication, a primary spring biasing the piston upwardly, a pressure reduction valve spring disposed between the spool and the piston, and a pressure receiving chamber communicated with the outlet port for pushing the spool in a direction for blocking communication by the output pressure. When the piston is in an upper stroke end position, the spool is in a blocking position, and when the piston is located at a position lower than the upper stroke end position, the spool is in a communicating position.

First and second cams are mounted on a support shaft, to which the operation lever is fixed. A first thin portion and a first thick portion contacting with the head portions of the pistons of the first and second pressure reduction valves are provided on the first cam, and a second thick portion and a second thin portion contacting with the head portions of the pistons of the third and fourth pressure reduction are provided on the second cam.

While the operation lever is in the neutral position, the first and second thin portions are placed above the first and second thick portions, at this time, the pistons of the first and fourth pressure reduction valves are placed and at the upper stroke end positions and the pistons of the second and third pressure reduction valves are placed at positions lower than the upper stroke end positions.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

BEST MODE FOR IMPLEMENTING THE INVENTION

The preferred embodiment of a hydraulic pilot valve according to the present invention will be discussed hereinafter with reference to the accompanying drawings.

Figure 2:
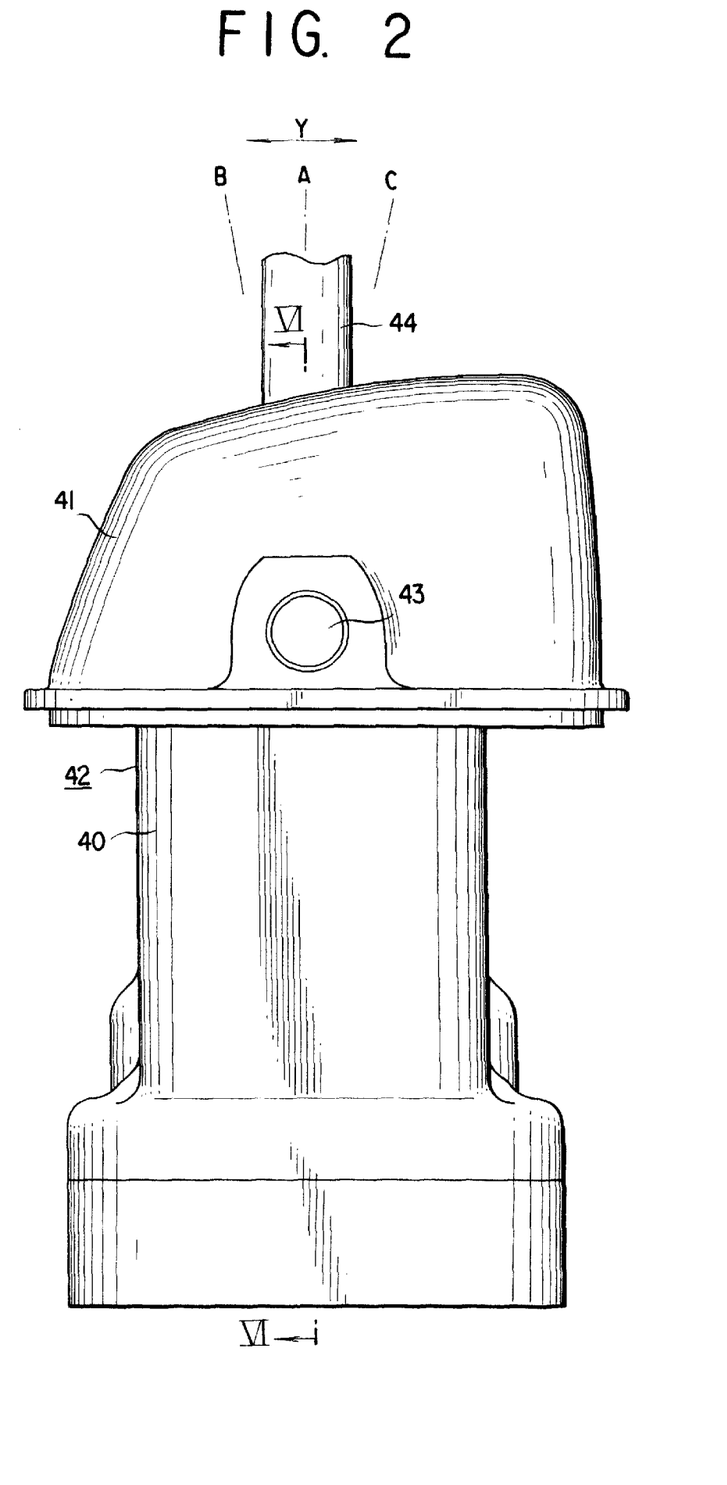
FIG. 2 is a front elevation of a first embodiment of a hydraulic pilot valve according to the present invention.
Figure 3:
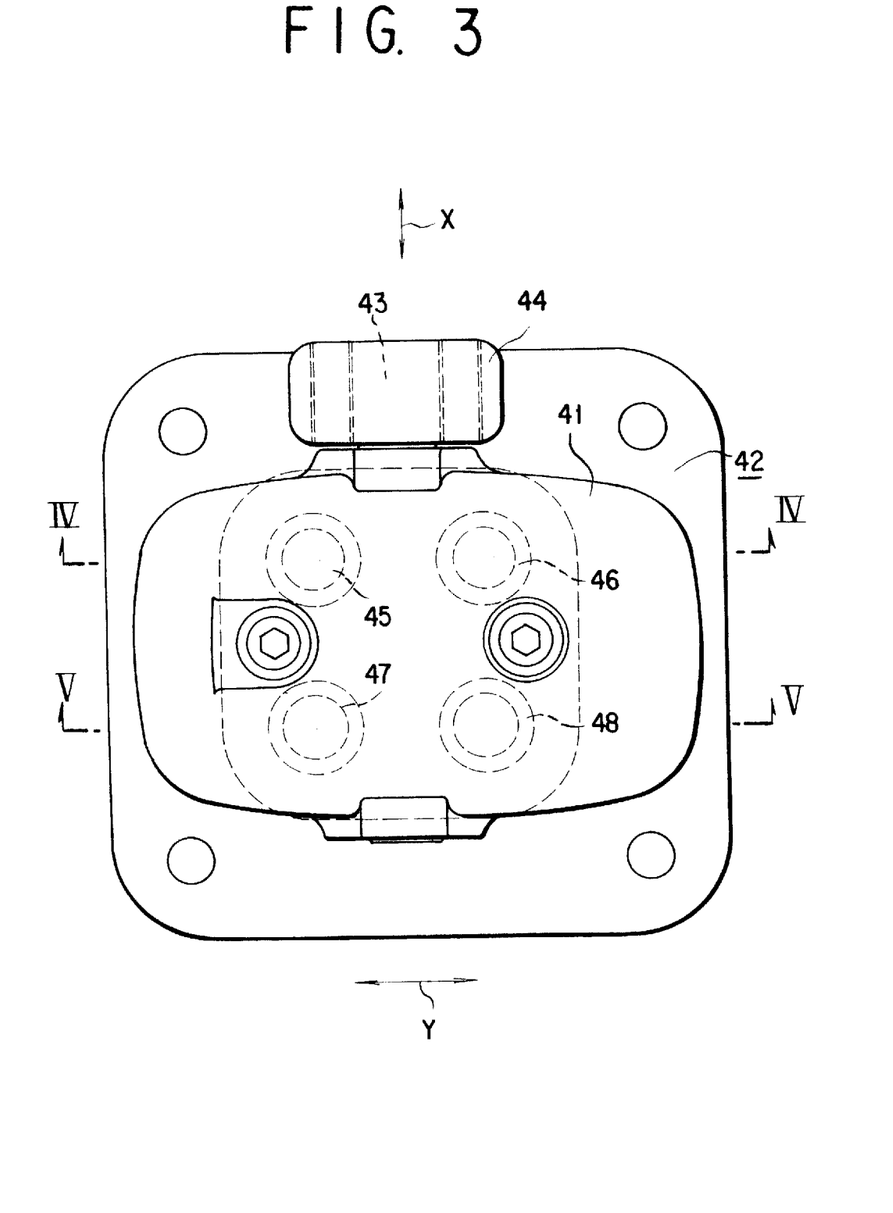
FIG. 3 is a plan view of the first embodiment.

FIGS. 2 and 3 show the first embodiment of a hydraulic pilot valve. A valve body 42 is formed with a lower body 40 and an upper body 41. On the upper body 41, a shaft 43 extending in an X direction is supported rotatably. On one end of the shaft 43, an operation lever 44 is mounted. The operation lever 44 is pivotally movable in a Y direction between a first position B and a second position C across a neutral position A. On the lower body 40, a first pressure reduction valve 45 and a second pressure reduction valve 46 are provided at both sides in the Y direction across the shaft 43. At positions spaced from the first and second pressure reduction valves 45 and 46 in the X direction, third and fourth pressure reduction valves 47 and 48 are provided at both sides in the Y-direction across the shaft 43.

The first, second, third and fourth pressure reduction valves 45, 46, 47 and 48 respectively include spools 51 for establishing and blocking communication between an inlet port 49 and outlet ports $50_1$, $50_2$, $50_3$ and $50_4$, pistons 52 for depressing the spools 51 downwardly, primary springs 53 biasing the piston upwardly, and pressure reducing spring 54 respectively disposed between the pistons 52 and the spools 51 for biasing them to move away from each other. Also, in the lower end of each spool 51 is inserted a load piston 55 for defining a pressure receiving chamber 56. Respective pressure receiving chambers 56 are communicated with the outlet ports $50_1$, $50_2$, $50_3$ and $50_4$, respectively.

Figure 4:
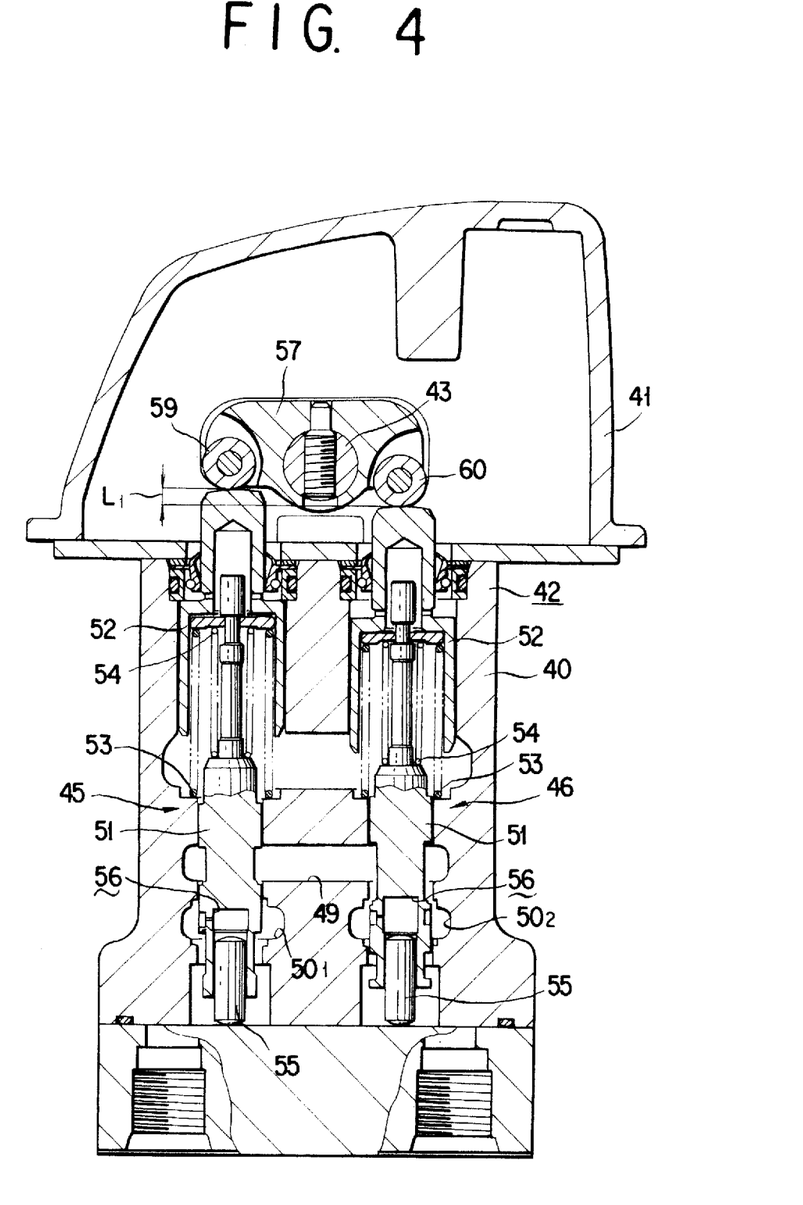
FIG. 4 is a section taken along line IV—IV of FIG. 3.
Figure 5:
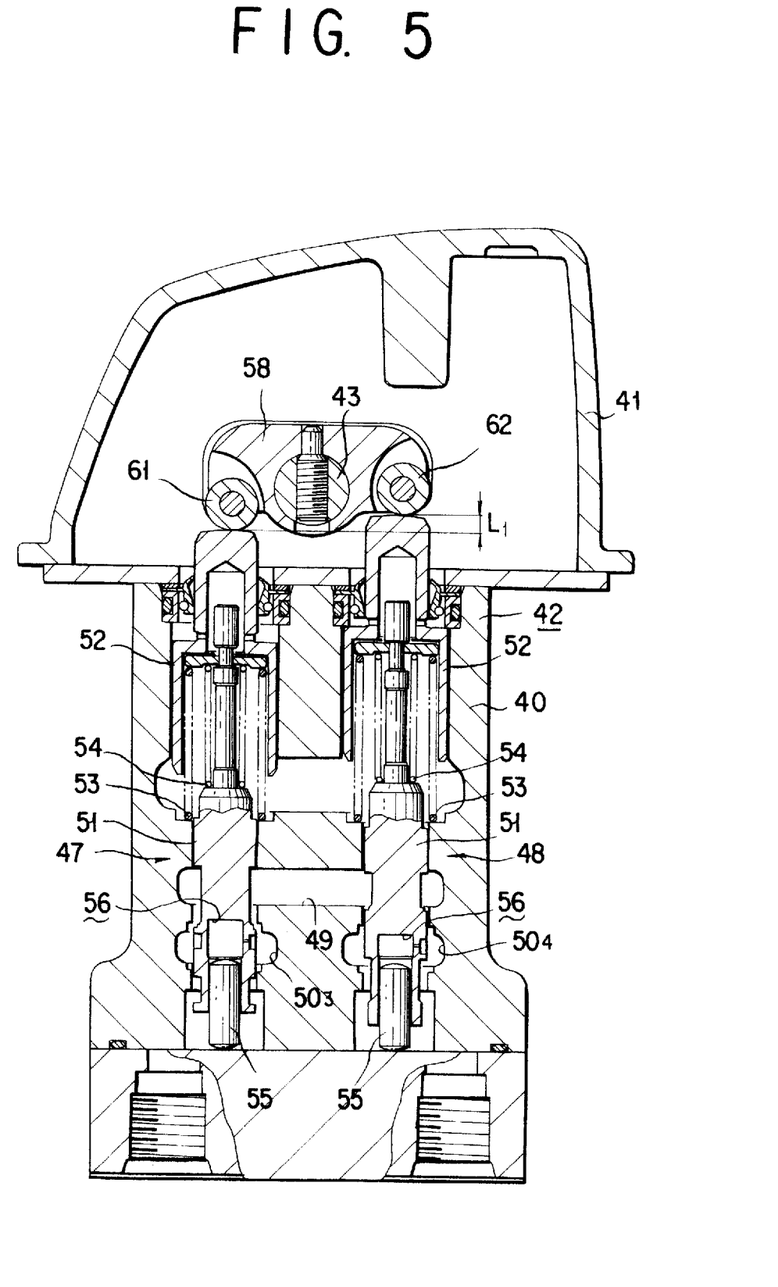
FIG. 5 is a section taken along line V—V of FIG. 3.
Figure 6:
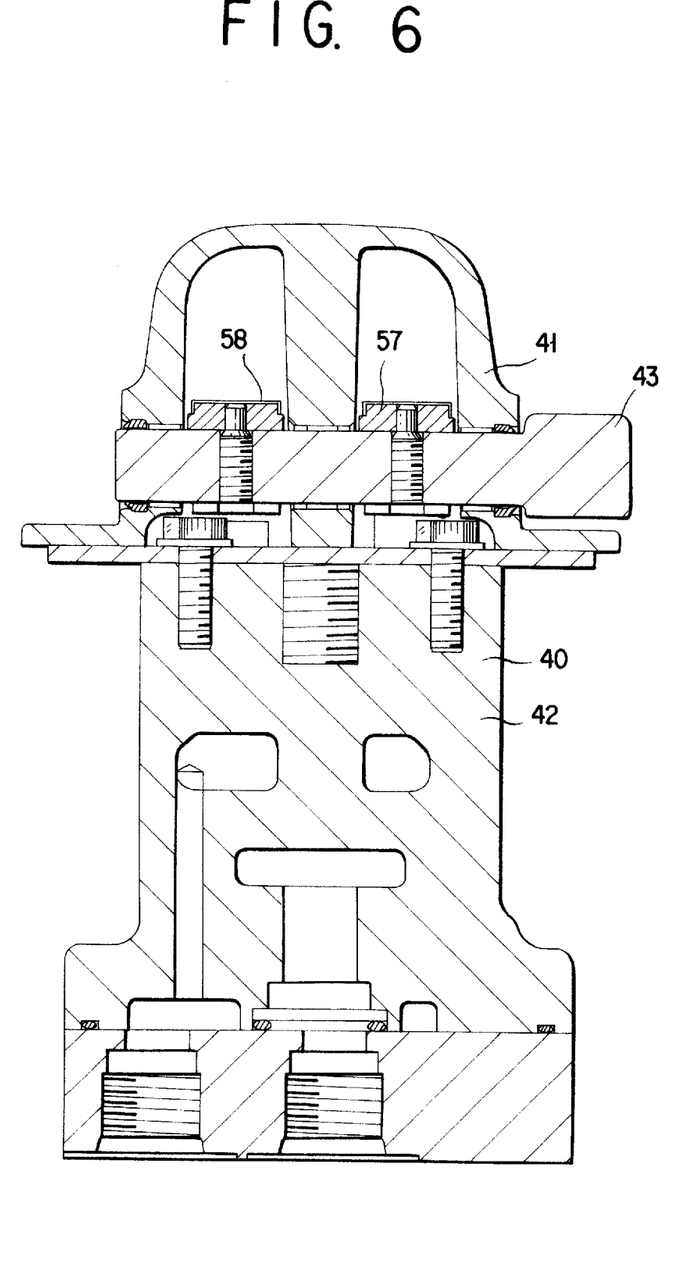
FIG. 6 is a section taken along line VI—VI of FIG. 2.

On the shaft 43, first and second arms 57 and 58 are mounted with a given spacing in the axial direction, as shown in FIG. 6. As shown in FIG. 4, onto a first roller 59 mounted on the first arm 57, the head portion of the piston 52 of the first pressure reduction valve 45 is abutted under pressure by the primary spring 53. Onto a second roller 60 mounted on the first arm 57, the head portion of the piston 52 of the second pressure reduction valve 46 is abutted under pressure by the primary spring 53. As shown in FIG. 5, onto a third roller 61 mounted on the second arm 58, the head portion of the piston 52 of the third pressure reduction valve 47 is abutted under pressure by the primary spring 53. Onto a fourth roller 62 mounted on the second arm 58, the head portion of the piston 52 of the fourth pressure reduction valve 48 is abutted under pressure by the primary spring 53.

The first and second arms 57 and 58 are in substantially horizontal attitude when the operation lever 44 is in the neutral position A. Then, as shown in FIGS. 4 and 5, while the first and second arms 57 and 58 are in horizontal attitudes, the first roller 59 and the fourth roller 62 are placed at higher positions than the second roller 60 and the third roller 61 by the distance $L_1$.

Therefore, when the operation lever 44 is in the neutral position A, the pistons 52 of the first and fourth pressure reduction valves 45 and 48 are upwardly shifted up to the stroke ends to shift the respectively corresponding pools 51 upwardly to block communication between the inlet port 49 and the outlet ports $50_1$ and $50_4$, as shown in FIGS. 4 and 5. On the other hand, since the pistons 52 of the second and third pressure reduction valves 46 and 47 are shifted to the position lower than the stroke end by the distance $L_1$, respective spools 51 corresponding thereto are shifted downwardly to be placed at positions establishing communication between the inlet port 49 and outlet ports $50_2$ and $50_3$.

Therefore, when the operation lever 44 is in the neutral position A, the output pressures output from the outlet ports $50_1$ and $50_4$ of the first and fourth pressure reduction valves 45 and 48 are zero, and output pressures are generated at the outlet ports $50_2$ and $50_3$ of the second and third pressure reduction valves 46 and 47.

Figure 7:
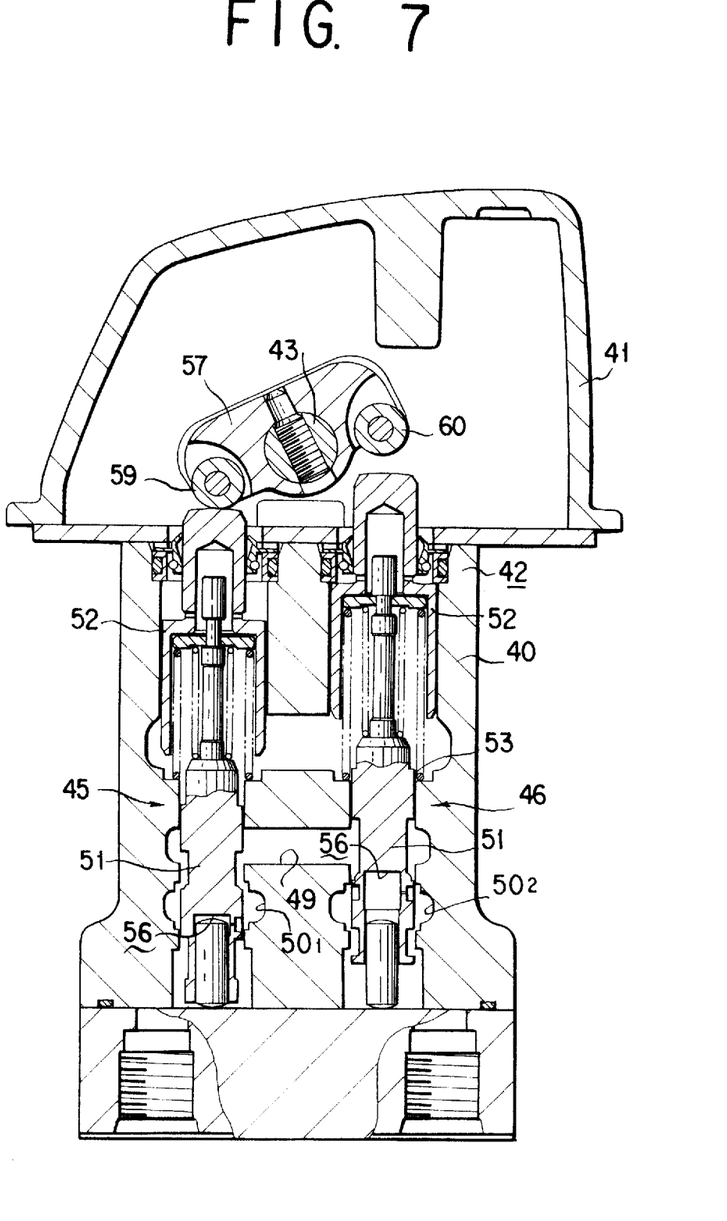
FIG. 7 is a section for explaining operation of first and second pressure reduction valves of the foregoing first embodiment.
Figure 8:
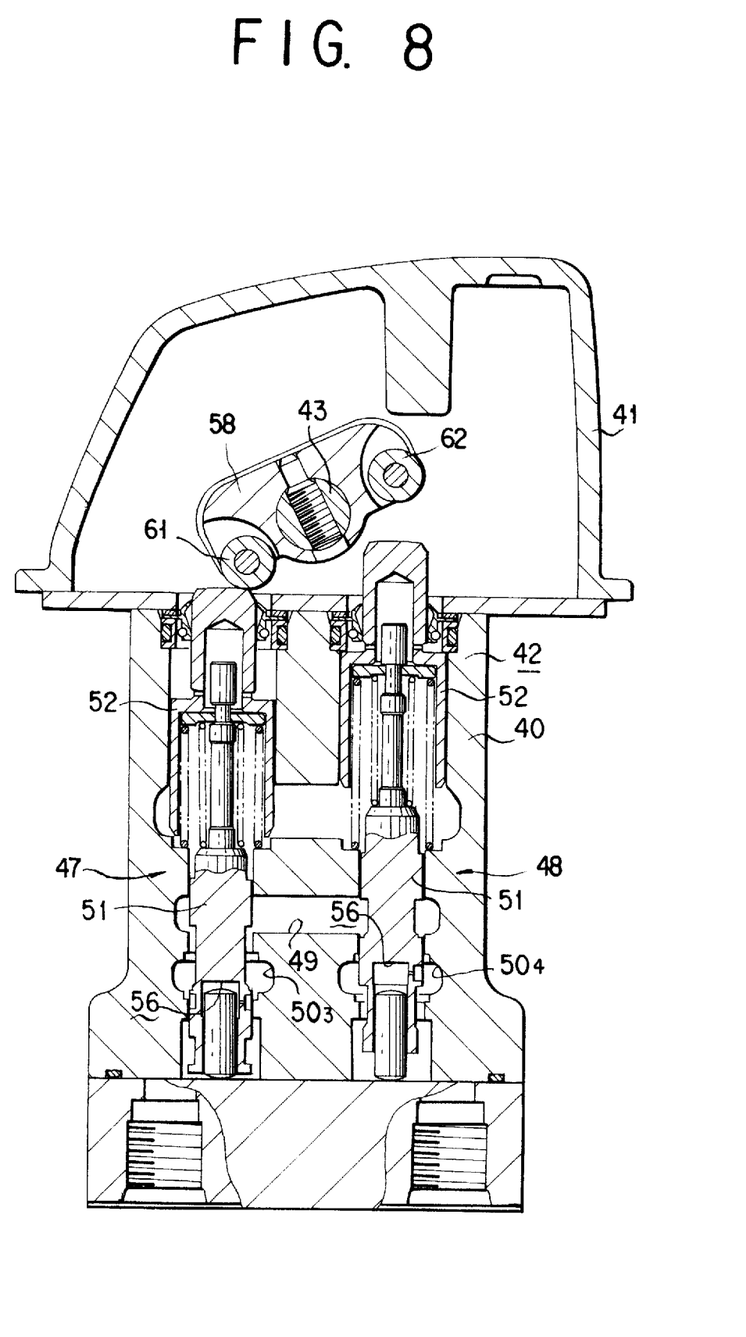
FIG. 8 is a section for explaining operation of third and fourth pressure reduction valves of the foregoing first embodiment.
Figure 9A:
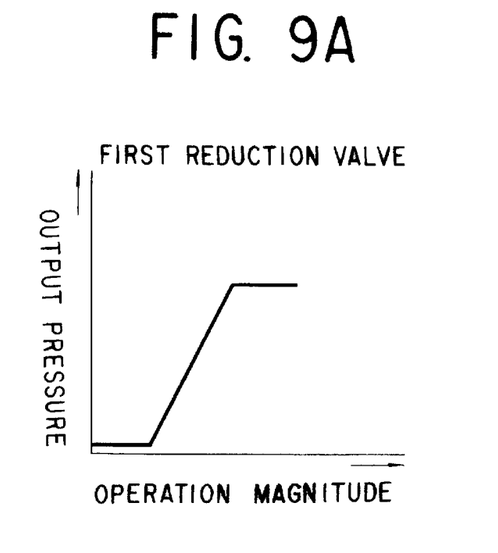
FIGS. 9A to 9D are charts showing relationships between an operation magnitude of an operation lever and output pressures of the first to fourth pressure reduction valves respectively.
Figure 9B:
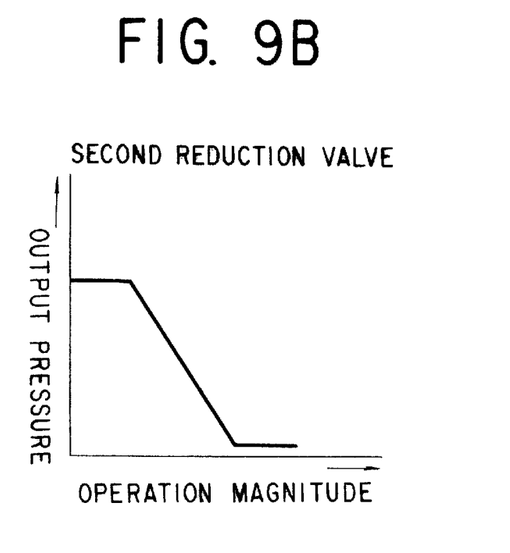
Figure 9C:
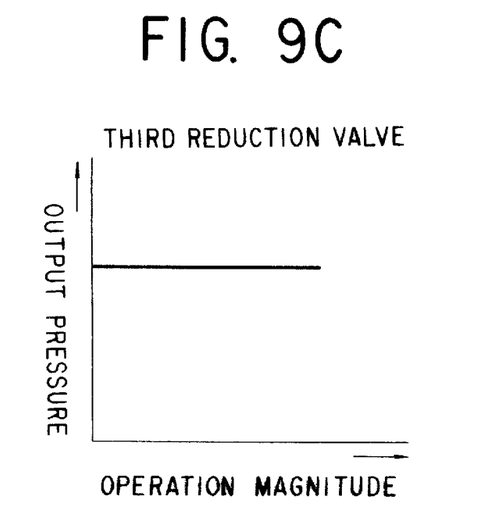
Figure 9D:
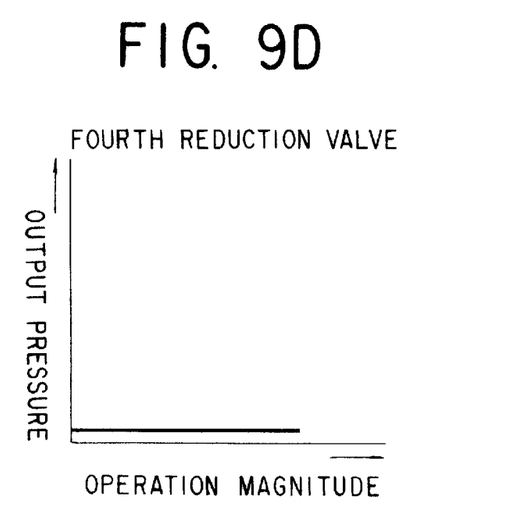

Next, when the operation lever 44 is moved in one direction to be placed at the first position B, the first and second arms 57 and 58 are pivoted in one direction as shown in FIGS. 7 and 8. The piston 52 of the first pressure reduction valve 45 is depressed downwardly by the first roller 59 to place the corresponding spool 51 at the position establishing communication between the inlet port 49 and the outlet port $50_1$. On the other hand, the second roller 60 is moved away from the piston 52 of the second pressure reduction valve 46. Thus, the piston 52 is shifted upwardly up to the stroke end by the primary spring 53, the corresponding spool 51 is pushed upwardly by the output pressure introduced into a pressure receiving chamber 56 to be placed at the position blocking communication between the inlet port 49 and the outlet port $50_2$.

Since the piston 52 of the third pressure reduction valve 47 is pushed further downwardly by the third roller 61, the corresponding spool 51 is maintained at the position establishing communication between the inlet port 49 and the outlet port $50_3$. Also, the fourth roller 62 is moved away from the piston 52 of the fourth pressure reduction valve 48. Thus, the corresponding spool 51 is maintained at the position blocking communication between the inlet port 49 and the outlet port $50_4$.

Thus, when the operation lever 44 is pivoted from the neutral position A to the first position B, the outlet port $50_1$ of the first pressure reduction valve 45 outputs the output pressure, the outlet port $50_2$ of the second pressure reduction valve 46 stops outputting of the output pressure, the outlet port $50_3$ of the third pressure reduction valve 47 maintains outputting of the output pressure, and the outlet port $50_4$ of the fourth pressure reduction valve 48 stops outputting of the output pressure, as shown in FIGS. 9A to 9D.

Figure 10A:
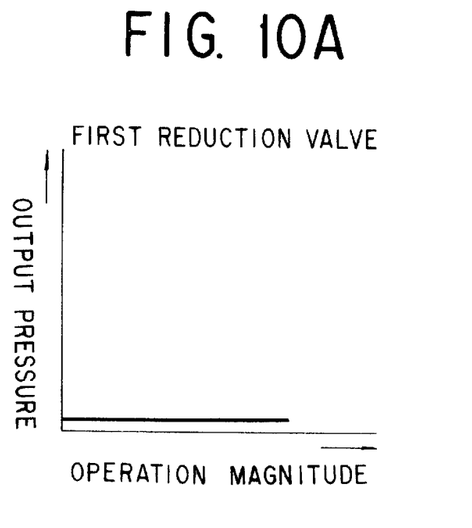
FIGS. 10A to 10D are charts showing relationship between the operation magnitude of the operation lever and the output pressures of the first to fourth pressure reduction valves, respectively.
Figure 10B:
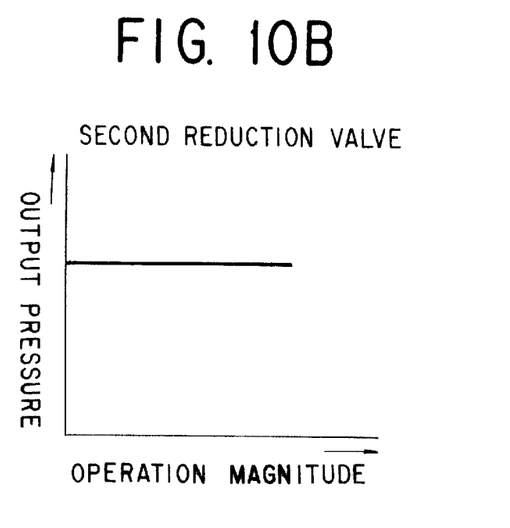

On the other hand, when the operation lever 44 is operated from the neutral position A to the second position C, since the first roller 59 is shifted away from the piston 52 of the first pressure reduction valve 45, the outlet port $50_1$ of the first pressure reduction valve 45 maintains the condition not outputting the output pressure, as shown in FIG. 10A, and the piston 52 of the second pressure reduction valve 46 is depressed by the second roller, the outlet port $50_2$ of the second pressure reduction valve 46 maintains outputting of the output pressure as shown in FIG. 10B.

Figure 10C:
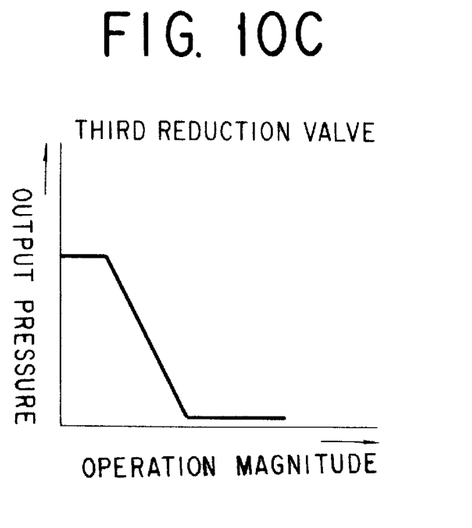
Figure 10D:
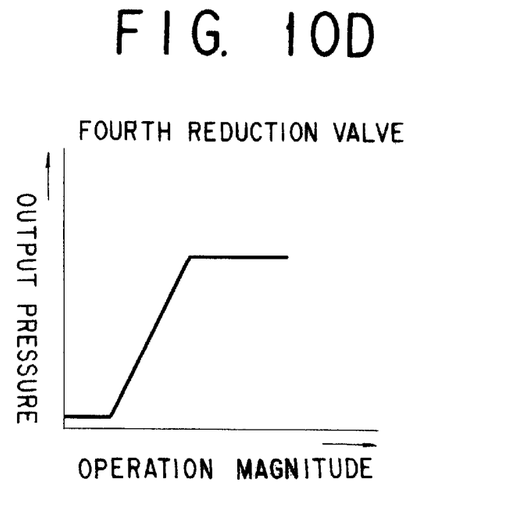

Furthermore, since the third roller 61 is shifted away from the piston 52 of the third pressure reduction valve 47, the outlet port $50_3$ stops outputting of the output pressure, as shown in FIG. 10C, and the piston 52 of the fourth pressure reduction valve 48 is depressed by the fourth roller 62, the outlet port $50_4$ starts outputting of the output pressure as shown in FIG. 10D.

Accordingly, by connecting the outlet port $50_1$ of the first pressure reduction valve 45 to the pressure receiving chamber 12 of the left brake cylinder 10 of the left hydraulic steering brake 4 shown in FIG. 1, connecting the outlet port $50_2$ of the second pressure reduction valve 46 to the pressure receiving chamber 8 of the left clutch cylinder 6 of the left hydraulic clutch 2 shown in FIG. 1, connecting the outlet port $50_3$ of the third pressure reduction valve 47 to the pressure receiving chamber 9 of the right clutch cylinder 7 of the right hydraulic clutch 3 shown in FIG. 1, and connecting the outlet port $50_4$ of the fourth pressure reduction valve 48 to the pressure receiving chamber 13 of the right brake cylinder 11 of the right hydraulic steering brake 5 shown in FIG. 1, the crawler type vehicle can travel straight while the operation lever is in the neutral position even if the left and right hydraulic steering clutches 2 and 3 are constructed to be normally held disconnected, and to be connected when the pressurized fluid is supplied to the left and right clutch cylinders 6 and 7.

Namely, when the operation lever 44 is in neutral position A, the output pressures is generated at the outlet ports $50_2$ and $50_3$ of the second and third pressure reduction valves 46 and 47. Therefore, the pressurized fluid is supplied to the pressure receiving chambers 8 and 9 of the left and right clutch cylinders 6 and 7 of the left and right hydraulic clutches 2 and 3 to cause their engagements, respectively. In conjunction therewith, the pressurized fluid is not supplied to the pressure receiving chambers 12 and 13 of the left and right brake cylinders 10 and 11 to place the left and right hydraulic steering brakes 4 and 5 in non-braking state. Thus, the crawler type vehicle can travel straight.

On the other hand, when the operation lever 44 is placed at the first position B, the output pressures are output from the outlet ports $50_1$ and $50_3$ of the first and third pressure reduction valves 45 and 47, and are not output from the outlet ports $50_2$ and $50_4$ of the second and fourth pressure reduction valves 46 and 48. Therefore, the left hydraulic steering brake 4 attains the braking state and the left hydraulic steering clutch 2 is disconnected. In conjunction therewith, the right hydraulic steering clutch 3 is connected and the right hydraulic steering brake 5 attains a non-braking state. Thus, the crawler type vehicle can travel through a left turn.

On the other hand, when the operation lever 44 is placed at the second position C, the output pressures are output from the outlet ports $50_2$ and $50_4$ of the second and fourth pressure reduction valves 46 and 48, and no output pressures are output from the outlet ports $50_1$ and $50_3$ of the first and third pressure reduction valves 45 and 47. Therefore, the left hydraulic steering brake 4 attains the non-braking state and the left hydraulic steering clutch 2 is connected. In conjunction therewith, the right hydraulic steering clutch 3 is disconnected and the right hydraulic steering brake 5 attains a braking state. Thus, the crawler type vehicle can travel through a right turn.

Figure 11:
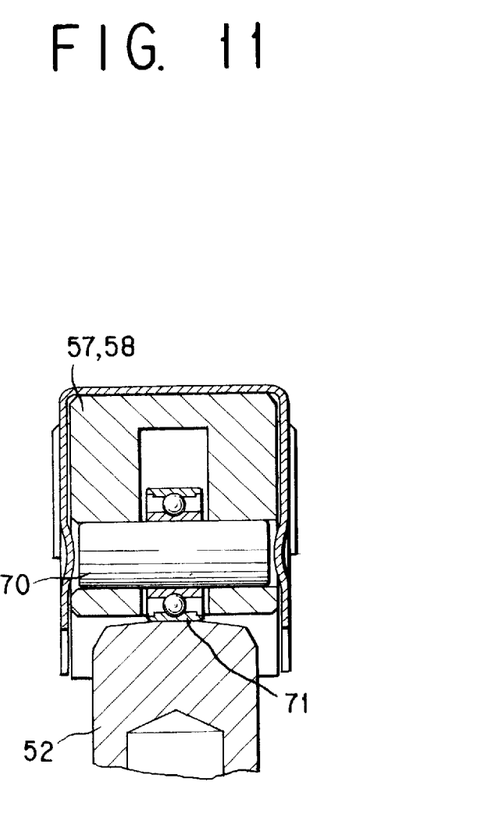
FIG. 11 is a section showing a portion for pushing a piston according to a second embodiment.

While the first, second, third and fourth rollers 59, 60, 61 and 62 are provided on the first and second arms 57 and 58 in the foregoing first embodiment, it is possible to mount a support shaft 70 on the first and second arms 57 and 58, and to mount ball bearings 71 on the support shaft to push the piston 52 via the ball bearings 71 as in the second embodiment illustrated in FIG. 11.

With this construction, sliding resistance between the ball bearing 71 and the piston 52 can be smaller than sliding resistance between the rollers and the piston 52.

Figure 12:
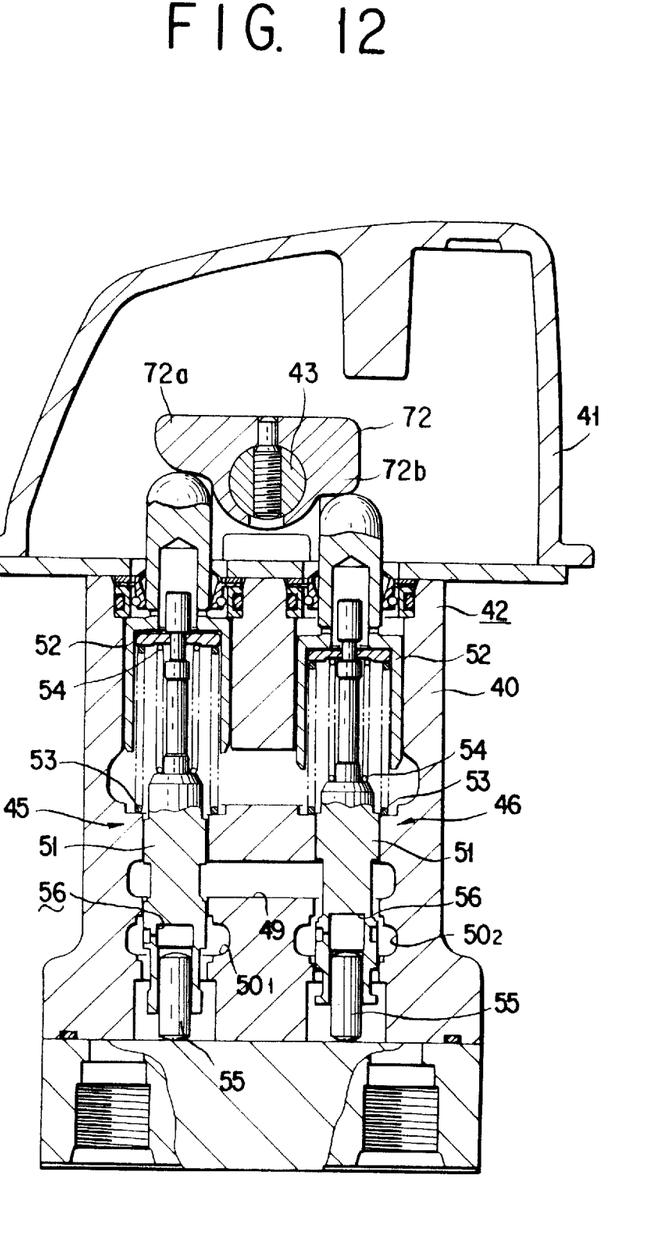
FIG. 12 is a section showing portions for pushing pistons of first and second pressure reduction valves, according to a third embodiment.
Figure 13:
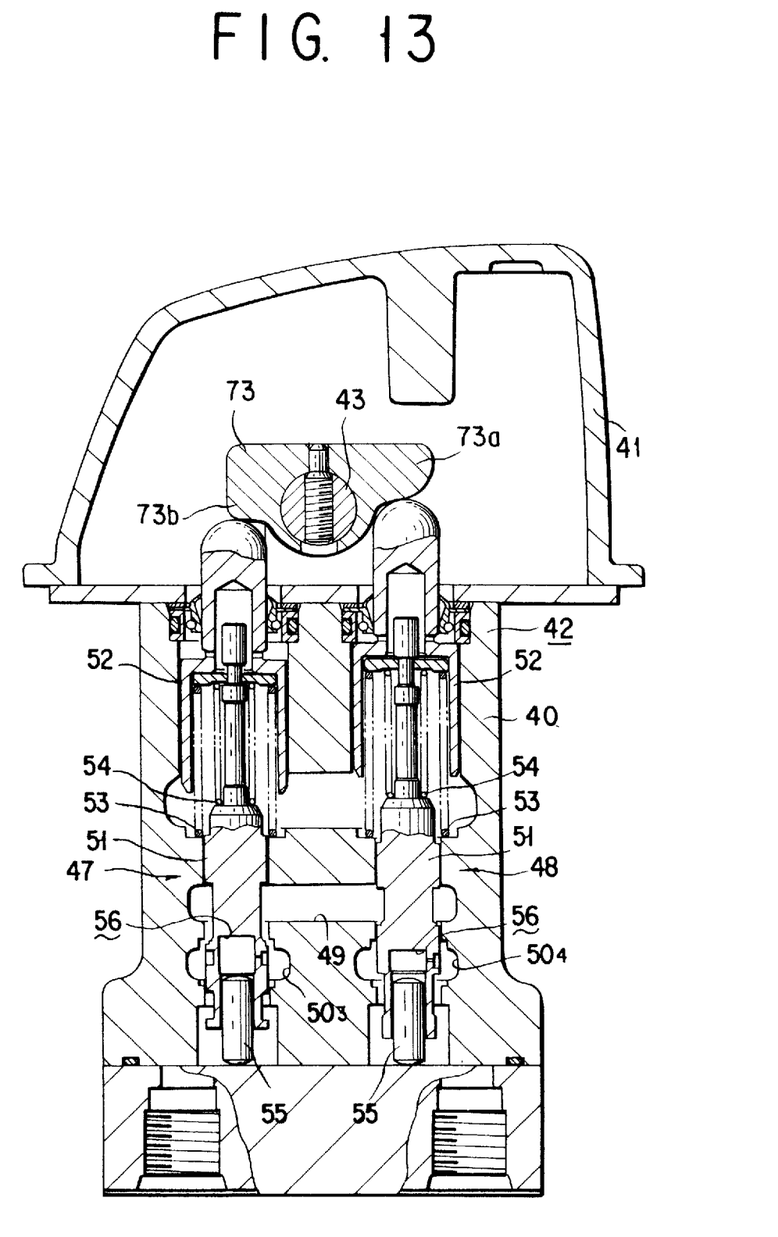
FIG. 13 is a section showing portions for pushing pistons of the third and fourth pressure reduction valves, according to the third embodiment.

Also, in the third embodiment illustrated in FIGS. 12 and 13, it is possible to mount first and second cams 72 and 73 on the shaft 44 such that a thin portion 72a of the first cam 72 is provided in opposition to the piston 52 of the first pressure reduction valve 45, a thick portion 72b of the first cam 72 is provided in opposition to the piston 52 of the pressure reduction valve 46, a thick portion 73b of the second cam 73 is provided in opposition to the piston 52 of the third pressure reduction valve 47, and a thin portion 73a is provided in opposition to the piston 52 of the fourth pressure reduction valve 48.

As set forth above with the hydraulic pilot valve according to the present invention, when the operation lever 44 is in the neutral position A, the output pressure is output from the second and third pressure reduction valves 46 and 47, in the first position B, the output pressures are output from the first and third pressure reduction valves 45 and 47, and in the second position C, the output pressures are output from the second and fourth pressure reduction valves 46 and 48.

Accordingly, by connecting the outlet ports $50_1$, $50_2$, $50_3$ and $50_4$ of the first, second, third and fourth pressure reduction valves 45, 46, 47 and 48 to the pressure receiving chamber 12 of the left brake cylinder 10 of the left hydraulic steering brake 4, the pressure receiving chamber 8 of the left clutch cylinder 6 of the left hydraulic clutch 2, the pressure receiving chamber 9 of the right clutch cylinder 7 of the right hydraulic steering clutch 3, and the pressure receiving chamber 13 of the right brake cylinder 11 of the right hydraulic steering brake 5 of the crawler type vehicle, the crawler type vehicle can travel straight at the neutral position of the operation lever even where the left and right hydraulic steering clutches 2 and 3 are normally held disconnected and are connected when the pressurized fluid is supplied to the left and right clutch cylinders 6 and 7.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed by the appended claims and equivalents thereof, with respect to the feature set out in the appended claims.

We claim:

1. A hydraulic pilot valve comprising
   a valve body,
   first, second, third and fourth pressure reduction valves formed in said valve body and respectively having outlet ports, inlet ports and spools for establishing and blocking communication between said inlet ports and said outlet ports, an operation mechanism comprising an operation lever pivotally mounted on said valve body for movement between a neutral position, a first position and a second position, and wherein said operation mechanism is operably engaged with said first, second, third and fourth pressure reduction valves so as to constitute a means for operating said pressure reduction valves such that:

when said operation lever is in said neutral position, said respective spools of said second and third pressure reduction valves are placed at positions establishing communication between said respective inlet ports and outlet ports;

when said operation lever is in said first position, said respective spools of said first and third pressure reduction valves are placed at positions establishing communication between said respective inlet ports and outlet ports, and in conjunction therewith, said respective spools of said second and fourth pressure reduction valves block communication between said respective inlet ports and outlet ports; and when said operation lever is in said second position, said respective spools of said first and third pressure reduction valves are placed at positions blocking communication between said respective inlet ports and outlet ports, and in conjunction therewith, said respective spools of said second and fourth pressure reduction valves are placed at positions establishing communication between said respective inlet ports and outlet ports.

2. A hydraulic pilot valve comprising a valve body, first, second, third and fourth pressure reduction valves formed in said valve body and respectively having outlet ports, inlet ports and spools for establishing and blocking communication between said inlet ports and said outlet ports, an operation mechanism comprising an operation lever pivotally mounted on said valve body for movement between a neutral position, a first position and a second position; and wherein each of said first, second, third and fourth pressure reduction valves includes a piston for pushing said spool in a direction for establishing communication between said inlet port and said outlet port, a primary spring biasing said piston outwardly, a pressure reduction valve spring disposed between said spool and said piston, and a pressure receiving chamber communicated with said outlet port such that output pressure of said outlet port causes pushing of said spool in a direction for blocking communication between said inlet port and said outlet port, and wherein, when said piston is in an upper stroke end position, said spool is in a blocking position blocking communication between said inlet port and said outlet port and, when said piston is located at a position lower than said upper stroke end position, said spool is in a communicating position communicating said inlet port with said outlet port;

wherein said hydraulic pilot valve further comprises a support shaft, said operation lever being fixed to said support shaft, first and second arms mounted on said support shaft, and wherein first and second rollers contacting with head portions of the pistons of said first and second pressure reduction valves are mounted on said first arm, and third and fourth rollers contacting with head portions of the pistons of said third and fourth pressure reduction valves are mounted on said second arm;

wherein, when said operation lever is in the neutral position, said first and fourth rollers are placed above said second and third rollers and, at this time, each of said pistons of said first and fourth pressure reduction valves is placed at the upper stroke end position, and each of the pistons of said second and third pressure reduction valves is located at a position lower than said upper stroke end position.

3. A hydraulic pilot valve as set forth in claim 2, wherein said operation mechanism is operably engaged with said first, second, third and fourth pressure reduction valves so as to constitute a means for operating said pressure reduction valves such that:

when said operation lever is in said neutral position, said respective spools of said second and third pressure reduction valves are placed at positions establishing communication between said respective inlet ports and outlet ports;

when said operation lever is in said first position, said respective spools of said first and third pressure reduction valves are placed at positions establishing communication between said respective inlet ports and outlet ports, and in conjunction therewith, said respective spools of said second and fourth pressure reduction valves block communication between said respective inlet ports and outlet ports; and when said operation lever is in said second position, said respective spools of said first and third pressure reduction valves are placed at positions blocking communication between said respective inlet ports and outlet ports, and in conjunction therewith, said respective spools of said second and fourth pressure reduction valves are placed at positions establishing communication between said respective inlet ports and outlet ports.

4. A hydraulic pilot valve comprising a valve body, first, second, third and fourth pressure reduction valves formed in said valve body and respectively having outlet ports, inlet ports and spools for establishing and blocking communication between said inlet ports and said outlet ports, an operation mechanism comprising an operation lever pivotally mounted on said valve body for movement between a neutral position, a first position and a second position; and wherein each of said first, second, third and fourth pressure reduction valves includes a piston for pushing said spool in a direction for establishing communication between said inlet and said outlet, a primary spring biasing said piston upwardly, a pressure reduction valve spring disposed between said spool and said piston, and a pressure receiving chamber communicated with said outlet port such that output pressure of said outlet port causes pushing of said spool in a direction for blocking communication between said inlet port and said outlet port, and wherein, when said piston is in an upper stroke end position, said spool is in a blocking position blocking communication between said inlet port and said outlet port and, when said piston is located at a position lower than said upper stroke end position, said spool is in a communicating position communicating said inlet port with said outlet port;

wherein said hydraulic pilot valve further comprises a support shaft, said operation lever being fixed to said support shaft, and first and second cams mounted on said support shaft, and wherein a first thin portion and a first thick portion contacting with head portions of the pistons of said first and second pressure reduction valves are provided on said first cam, and a second thick portion and a second thin portion contacting with head portions of the pistons of said third and fourth pressure reduction valves are provided on said second cam; and wherein, when said operation lever is in the neutral position, said first and second thin portions are placed above the first and second thick portions and, at this time, each of the pistons of said first and fourth pressure reduction valves is placed at the upper stroke end position and each of the pistons of said second and third pressure reduction valves is placed at a position lower than said upper stroke end position.

5. A hydraulic pilot valve as set forth in claim 3, wherein said operation mechanism is operably engaged with said first, second, third and fourth pressure reduction valves so as to constitute a means for operating said pressure reduction valves such that:

when said operation lever is in said neutral position, said respective spools of said second and third pressure reduction valves are placed at positions establishing communication between said respective inlet ports and outlet ports;

when said operation lever is in said first position, said respective spools of said first and third pressure reduction valves are placed at positions establishing communication between said respective inlet ports and outlet ports, and in conjunction therewith, said respective spools of said second and fourth pressure reduction valves block communication between said respective inlet ports and outlet ports; and when said operation lever is in said second position, said respective spools of said first and third pressure reduction valves are placed at positions blocking communication between said respective inlet ports and outlet ports, and in conjunction therewith, said respective spools of said second and fourth pressure reduction valves are placed at positions establishing communication between said respective inlet ports and outlet ports.

* * * * *